FIG. I

Dec. 30, 1958   R. R. WISEMAN, JR   2,866,526
AUTOMATIC BRAKE ADJUSTMENT
Filed Oct. 6, 1955   2 Sheets-Sheet 2

INVENTOR.
ROY R. WISEMAN, JR.
BY
R. L. Miller
ATTORNEY

United States Patent Office 2,866,526
Patented Dec. 30, 1958

2,866,526

AUTOMATIC BRAKE ADJUSTMENT

Roy R. Wiseman, Jr., Akron, Ohio, assignor to The Goodyear Tire & Rubber Company, Akron, Ohio, a corporation of Ohio Application October 6, 1955, Serial No. 538,991

1 Claim. (Cl. 188—73)

This invention relates to brakes for use on vehicles or aircraft and is especially useful in the construction of aircraft brakes having movable brake shoes operated by hydraulic cylinders.

In the construction of brakes, especially for use on aircraft, it has been found desirable to provide a disc rotatable with the wheel, a brake housing stationary relative to the wheel and provided with spot type brake units comprising a hydraulic cylinder formed in the brake housing and a brake shoe mounted on a piston operating in the cylinder, a plurality of such shoes and cylinders being sometimes provided.

As the amounts of energy necessary to be absorbed in landing aircraft is exceptionally high, the brake shoe wear is very rapid. For best operation, it is desirable to provide clearance between the brake disc and the brake shoes and at the same time providing a minimum of piston movement with consequent minimum use of hydraulic operating fluid and a minimum of brake application time.

It has been proposed heretofore to provide such brakes with means for automatically adjusting them during use to maintain piston travel and consequent use of hydraulic fluid at a minimum. However, such automatic adjustment devices have required projecting adjustment pins which in some cases have been undesirable.

The present invention has for an object to provide automatic adjustment means for a brake cylinder which will be free from projecting pins or other parts and in which the adjusting means is entirely contained within an operating cylinder. Other objects are to provide simplicity of construction and facility of repair.

These and other objects will appear from the following description and the accompanying drawings.

Figure 1:
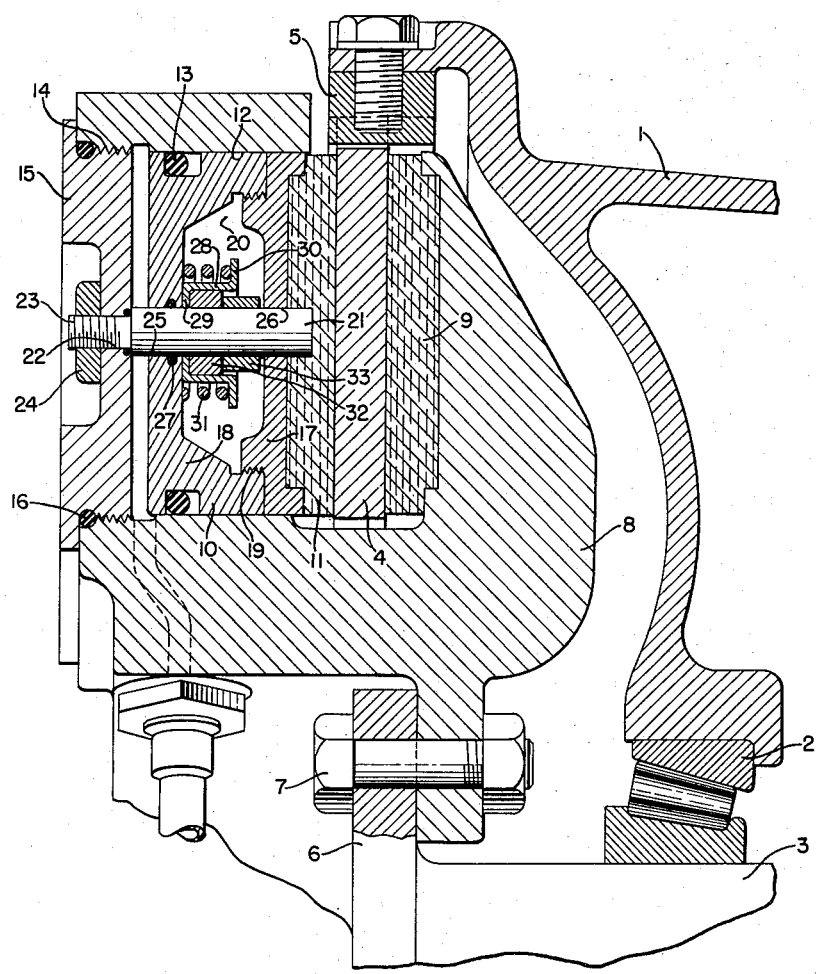
Fig. 1 is an axial cross-sectional view of one embodiment of the invention as applied to an airplane wheel and brake, the brake being shown in the engaged position.

Referring to the drawings, and first to Fig. 1 thereof, the numeral 1 designates an aircraft wheel mounted for free rotation by way of roller bearings 2 upon a stationary axle 3. A brake disc 4 is suspended from the rim of the wheel to which it is secured free from relative rotation by keys 5 entering notches about the periphery of disc. The disc may float axially upon the wheel. A brake supporting flange 6 is secured to the axle 3 and has fixed thereto, as by bolts 7, a nonrotatable brake support 8. The support 8 is formed with a gap open radially outward so as to embrace the brake disc 4. The support 8 may have a plurality of brake members one of which is shown and each of which comprises a brake shoe 9 fixed to the support 8 and facing the disc 4 on one side thereof, and a movable brake shoe comprising a piston 10 having a brake block 11 mounted thereon for engaging the opposite face of the disc, the piston 10 being mounted for movement in a direction axial of the wheel in a cylinder 12 formed in the brake support 8.

The piston 10 slides in the cylinder 12 and an O-ring 13 in a groove about the piston seals the joint. The outboard end of cylinder 12 is threaded as at 14, to receive a closure member in the form of a plug 15, a sealing ring 16 being provided to seal the joint. The piston is formed of two cup-shaped parts 17 and 18 having their lips secured to each other by a thread 19 to provide a hollow cylindrical cavity 20 therebetween.

For retracting the piston, when fluid pressure thereagainst is released, a pin 21 is secured in a central opening of plug 15 as by a reduced end 22 having a thread 23 secured to a nut 24 located in a recess of the plug. The pin projects inwardly of the cylinder 12 and through aligned central openings 25, 26 of the piston. A sealing ring 27 seals the piston to the pin. A tubular bushing 28 is mounted about the pin 21 and has an inwardly directed flange 29 at one end thereof and an outwardly directed flange 30 at its opposite end. A coil spring 31 is mounted about the bushing 28 with one end abutting the piston 10 and the opposite end abutting the flange 30. The length of the bushing 28 is less than the normal length of the spring. The arrangement is such that with the bushing 28 retained on the pin 21 against axial movement the difference in length of the bushing 28 and the spring 31 will be at least equal to the desired movement of the piston in moving to apply the brake.

For retaining the bushing 28 on the pin 21 frictionally, a gripping means comprising an axially split collar 32 of spring metal, known as a "roll pin type grip", surrounds the pin 21 in embracing frictional engagement therewith in a position to abut against the flange 29 within the bushing 28. A spacer sleeve 33 loosely encompasses the pin 21 between the collar 32 and the part 17 of the piston and the length of the spacer sleeve is less than the axial space 20 of the piston less the thickness of flange 29 and width of collar 32 by an amount equal to desired piston movement during a brake application.

The arrangement is such that should the piston move the desired amount without the brake being applied, the collar 32 will then be forced along the pin 21 to a new position where the brake block 11 will engage the disc 4.

Figures 2, 3:
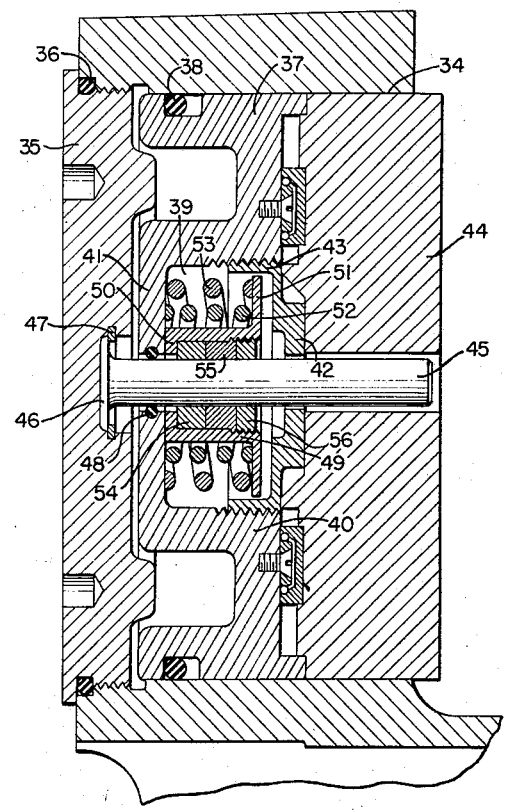
Fig. 2 is a similar view showing a modification thereof, the wheel and portions of the brake being omitted.
Fig. 3 is a similar view showing still a further modification.

In another embodiment of the invention, illustrated in Fig. 2, a brake cylinder 34 open at one end is closed at the other by a threaded closure plug 35, the joint being sealed by an O-ring 36. A piston 37 is slidably mounted in the cylinder and sealed thereto by an O-ring 38.

The piston is made in two parts to define a cylindrical space 39 and to this end the main portion 40 of the piston is bored axially to provide the space 39 and leaving an end wall 41. A second portion 42 is of cupped shape, having a cylindrical wall 43 externally threaded to engage internal threads of the portion 40. The portion 42 provides a second wall of the piston spaced from wall 41.

A brake block 44 is secured to the piston 37 and is adapted to frictionally engage a brake disc (not shown). Hydraulic fluid is applied to the cylinder 34 by suitable connections for moving the piston 37 and with it the brake block 44 against the disc or in a direction to the right in the drawing.

Means is provided for returning the piston when hydraulic pressure is removed therefrom and for this purpose and for providing automatic adjustment of the brake, a pin 45 is mounted axially and concentrically of the cylinder 34 and has an enlarged head 46 seated in a central recess of the plug 35 and retained in place by a spring snap ring 47. The pin projects through aligned central bores of the piston portions 41 and 42, the portion 40 being sealed to the pin by an O-ring 48. Within the space 39 of the piston, a bushing 49 surrounds the pin 45 in spaced apart relation thereto. The bushing 49 has an inwardly directed radial flange 50 at one end thereof and an outwardly directed radial flange 51 at its opposite end. A pair of coil springs 52, 53 of greater length than the bushing 49 encompass the bushing between the flange 51 and the wall 41 of the piston under compression and act to return the piston. The bushing 49 is of slightly less length than the space 39 between the walls of the piston, the difference in length being substantially equal to the desired piston movement.

For frictionally gripping or holding the bushing 49 in position on the pin 45, a plurality of split spring metal collars 54, 55 encompass the pin 45 within the bushing 49. A threaded collar 56 engages threads within bushing 49 and is located about pin 45 within the bushing 49. The collar 56 retains the collars 54, 55 against the flange 50. The arrangement is such that the piston 40 may move axially of pin 45 to the right in response to fluid pressure in cylinder 34 and may return to the left upon release of fluid pressure under the pressure of springs 52, 53 as long as such movements do not exceed the difference between the axial length of bushing 49 and the length of space 39. However, after such a degree of movement to the right under fluid pressure should the brake block still not reach the brake disc, the bushings 54, 55 will be forced along the pin 45 by the fluid pressure to a new position where brake contact is made. Whereupon the brake continues operation with the bushings 54, 55 at the new position until further wear of the brake block necessitates further automatic adjustment.

In the embodiment of the invention shown in Fig. 3, a nonrotatable brake support 57 has a flange 58 for securing it to a fixed axle and a bifurcated portion comprising limbs 59, 60 for facing a rotatable disc 61 carried by a wheel (not shown) in the manner illustrated in Fig. 1. The limb 59 is formed with a cylinder 62 for retaining a piston 63 which supports a brake block 64 for engaging one face of the disc 61, the opposite face being engaged by a brake block 65 mounted on limb 60. An O-ring 66 about a groove of the piston seals the piston to the cylinder 62.

For closing the outboard end of cylinder 62, a peripherally grooved disc 67 is provided. An O-ring 68 thereabout seals it to the cylinder. A spring snap ring 69 entering a groove in the cylinder wall retains the disc from movement out of the cylinder and across bar 70, spanning the cylinder and entering diametrically opposite notches therein, is secured to the disc by screws 71 so as to retain the disc against movement in the opposite direction.

To provide return of the piston and automatic adjustment of the brake, a central recess 72 is formed in the inner face of disc 67. A pin 73 having an enlarged flat head 74 has its head retained in the recess with the pin extending axially of the cylinder. For retaining the pin a relatively thin annular spring member 75 comprising an assembly of deformable spring rings is mounted about the pin 73 against the head 74 under compression and is retained by a snap ring 76 entering a groove in disc 67. The arrangement is such that pin 73 may have limited movement axially relative to the disc 67 against spring resistance.

The piston 63 has an axial cavity 77 for receiving the pin and a counterbore 78 thereabout for receiving a split spring ring 79 mounted on pin 73 under tension. The ring 79 is retained in counterbore 78 against axial movement by a snap-ring 80 entering a groove in the piston. The arrangement is such that the piston 64 is frictionally secured to the pin 73 and may move axially of the cylinder in our direction under fluid pressure and in the other direction under pressure of spring 75 with the pin an amount permitted by the clearance between the head 74 of the pin and its confining elements. Should such movement under fluid pressure in a direction to apply the brake be insufficient to permit applying the brake, as for example due to wear of the brake block, the piston will nevertheless be moved along the pin under frictional resistance of collar 79 to a new position where the block 64 engages the disc 61, thereby accomplishing automatic adjustment to keep brake clearance within desired limits.

A connection 81 supplies fluid under pressure to cylinder 62 to operate the brake and a bleed opening 82, closed by a screw 83 is provided to bleed air from the system.

In the operation of any of the embodiments of the invention, the brake disc carried by the wheel may rotate freely between the pair of brake blocks until hydraulic fluid under pressure is admitted to the brake cylinder. The piston in the cylinder is moved toward the brake disc by the fluid pressure within the limits of motion between the moving piston and the stationary brake support, the piston being returned, when hydraulic pressure is released, by the return spring. However, when such brake application requires more than normal movements as for example due to wear of the brake block, slippage of the piston along the pin may take place under pressure of the fluid to a new position of adjustment which maintains the normal desired brake clearance.

Thus, it will be seen that the objects of the invention have been accomplished. While certain representative embodiments and details have been shown for the purpose of illustrating the invention, it will be apparent to those skilled in the art that various changes and modifications may be made therein without departing from the spirit or scope of the invention.

What I claim is:

An automatic adjustment for a brake including a brake member having a cylindrical bore, a closure for one end of the bore, a pin secured to the closure and extending axially of the bore, a piston slidably received in the bore, a block of friction material secured to the side of the piston remote from the closure, said piston being formed in two axially separable cup-shaped parts having the cup lips joined together to define a hollow cylindrical cavity in the piston, the parts of the piston being axially drilled to slidably receive the pin which extends completely through the piston into engagement with the block, a friction grip on the pin in the cavity of the piston, and resilient means positioned between the friction grip and the end of the piston nearest the closure to move the end of the piston nearest the block against the friction grip.

References Cited in the file of this patent

UNITED STATES PATENTS

| | | |
|---|---|---|
| 2,392,970 | Bricker | Jan. 15, 1946 |
| 2,551,253 | Du Bois | May 1, 1951 |
| 2,746,254 | Lucien | May 22, 1956 |

FOREIGN PATENTS

| | | |
|---|---|---|
| 717,350 | Great Britain | Oct. 27, 1954 |
| 728,251 | Great Britain | Apr. 13, 1955 |